(12) United States Patent
Varga et al.

(10) Patent No.: US 6,253,611 B1
(45) Date of Patent: Jul. 3, 2001

(54) MAGNETIC FLOAT TYPE LIQUID LEVEL GAUGES

(75) Inventors: Otto Herman Varga, Bradford on Avon; Jason Carter, Bristol, both of (GB)

(73) Assignee: Seetru Limited (GB)

( * ) Notice: Subject to any disclaimer, the term of this patent is extended or adjusted under 35 U.S.C. 154(b) by 0 days.

(21) Appl. No.: 09/180,300

(22) PCT Filed: May 8, 1997

(86) PCT No.: PCT/GB97/01243

§ 371 Date: Nov. 5, 1998

§ 102(e) Date: Nov. 5, 1998

(87) PCT Pub. No.: WO97/43604

PCT Pub. Date: Nov. 20, 1997

(30) Foreign Application Priority Data

May 11, 1996 (GB) .................................................. 9609883

(51) Int. Cl.[7] .............................. G01F 23/56; G01F 23/76
(52) U.S. Cl. .............................................. 73/319; 73/322.5
(58) Field of Search .................................. 73/319, 322.5, 73/34

(56) References Cited

U.S. PATENT DOCUMENTS 3,766,786 * 10/1973 Gehatia et al. ........................ 73/453
5,020,367   6/1991 White .
5,473,245 * 12/1995 Silvus, Jr. et al. ..................... 73/314
5,743,137 *  4/1998 Brown et al. ......................... 73/319

FOREIGN PATENT DOCUMENTS 10 34 877   7/1958 (DE) .
11 39 660  11/1962 (DE) .
23 42 735   2/1975 (DE) .

* cited by examiner

Primary Examiner—Hezron Williams
Assistant Examiner—Katina Wilson
(74) Attorney, Agent, or Firm—Nixon & Vanderhye P.C.

(57) ABSTRACT

Liquid level indicators include an upright cylindrical tube of non-magnetic material, a cylindrical, permanent first magnet element aligned with and movable coaxially within the tube, a float, and an annular, permanent second magnet element aligned with and movable coaxially outside the tube. The first and second magnet elements have magnetic fields in alignment with one another, with one of the first and second magnet elements being carried by the float. The first and second magnet elements are axially spaced relative to one another such that the one magnet element which is carried by the float supports by magnetic attraction the other magnet element which is not carried by the float.

12 Claims, 4 Drawing Sheets

MAGNETIC FLOAT TYPE LIQUID LEVEL GAUGES

This invention relates to a liquid level indicating gauge apparatus of the kind which includes, in combination, an upright cylindrical tube of non-magnetic material, a first permanent magnet which is movable axially within and along the tube and a second permanent magnet which is magnetically coupled to the first magnet and is movable along the outside of the tube, and wherein one of said magnets is incorporated in a float that is adapted and arranged to float at the surface of a liquid, so that as the floating magnet rises and falls, the second magnet follows, rising and falling in sympathy, and thereby indicates the level of the surface of the liquid supporting the floating magnet.

In such arrangements as have been hitherto proposed, either the tube is immersed in the liquid whose level is to be measured of DE-A-1 139 660, or U.S. Pat. No. 5,020,367, for example; or in a converse arrangement, of DE-A-1 034 877, for example, the tube will contain such liquid. Thus the float may be in the form of a ring or collar surrounding the tube within which is located the second magnet; or in the converse arrangement, the floating magnet will be arranged within the gauge tube and a second magnet will be arranged in a follower arranged externally of the gauge tube.

Thus it is known to provide a gauge system where a float rises and falls inside a sealed gauge tube of non-magnetic material, such as austenitic stainless steel, and which tube is connected, in sealed manner, to a tank or receiver the liquid level of whose content is to be measured or indicated. Such a tank and gauge may for example contain inflammable or toxic fluid, or it may be part of a pressurised system. The pressure resisting and integral construction of a gauge of this type renders it particularly safe and suitable for use in marine, process engineering and many other services.

Where magnetic forces are used to couple two magnets, one arranged within, and the other arranged without the gauge tube, the magnetic coupling forces needed for one magnet reliably to follow the second magnet are very strong; and this is particularly the case with systems designed to be secure and reliable, so that shock or vibration cannot readily dislodge the follower magnet from its correct position.

And it is known to employ in such gauges, internal and external magnets which are magnetically coupled, either using forces of magnetic attraction, or using forces of magnetic repulsion. However where, as in DE-A-23 42 735, strong magnetic forces are employed, there are generally present significant radial forces pulling the coupled magnets towards or away from one another. This gives rises to severe instability of the magnetic array; with the inner magnet being urged laterally towards the side wall of the gauge tube, while equally strong forces pull the outer magnet towards the outer side of the tube. These radial forces give rise to friction which can greatly impair the accuracy of the level gauge indication. Indeed, the prior art does not disclose a practical and commercially usable system which provides for a magnetically stable array such that one magnet reliably follows the movements of the other, with high frictional forces being avoided.

Accordingly, it is the main purpose of this invention to provide a liquid level gauge tube device of the general kind referred to, with the tube having inner and outer coupled magnets, but in which the magnets are arranged in a magnetically stable array, with frictional forces set up between the float magnet and the tube wall on the one hand, and between the follower magnet and the tube wall on the other hand, being minimised, and with the system being such as to provide for a reliable, rapid and sensitive response to liquid level change causing float movement.

A further preferred requirement of such a device is that the visual indication of level should not be restricted substantially to a front on view of the external follower system. And it is preferred that the device should be light, simple and economic and should also lend itself to remote signalling; and preferably it should be capable of being adapted to indicate high and low level alarm positions.

Broadly, this invention provides a liquid level indicator which comprises, in combination, an upright cylindrical tube of non-magnetic material, a first permanent magnet movable coaxially within the tube, and a second annular permanent magnet movable coaxially outside the tube, both magnets having magnetic polar axes which are in parallel with the axis of the tube, and both magnets having like poles uppermost, and with one said magnet being carried by a float resting at the surface of the liquid whose level is to be indicated, and the magnets being so spaced that the magnet carried by the float supports the other magnet by magnetic repulsion at a level above that adopted by the floating magnet.

Preferably, a third permanent magnet is provided, which third magnet is mechanically linked either to said first permanent magnet or to said second permanent magnet and is of similar form to that of the magnet to which it is linked, and whose magnetic field is aligned in the same direction as the first and second magnets.

The first magnet may be carried by the float and the float is slidable within the tube, and the second magnet is attached to a liquid level indicator sleeve slidable along the outside of the tube.

According to another aspect of this invention there is provided a liquid level indicating gauge apparatus which includes, in combination, an upright cylindrical tube of non-magnetic material, a first permanent magnet of cylindrical disc-like or ring like shape movable axially within and along the tube and a second permanent magnet of annular shape surrounding the tube and movable axially along the outside thereof; and wherein both said magnets are so magnetized and maintained in such orientation relative to each other and to the tube as to have the same polarities in the field directions with their magnetic poles being aligned along the tube axis or in parallel therewith, and wherein one of said magnets is incorporated in a float that it is adapted and arranged to float at the surface of a liquid, while the other of said magnets is supported by magnetic repulsion at a level just above that adopted by the floating magnet, with said magnetic repulsion having both axial and radial components. Due to these components, both axial and radial, of the forces of magnetic repulsion, it is possible to arrange the coupled magnets, one supported by the other, in a magnetically stable array, and with the radial force component providing what equates to a "self-centreing" effect; or an effect where the magnets, one inside and one outside the gauge tube, tend to find positions which are substantially coaxial with the tube axis.

Either the tube will be immersed in the liquid whose level is to be measured; or the tube will contain such liquid. The floating magnet may be carried by a float which is in the form of a collar surrounding the tube; or the floating magnet will be mounted in a float arranged within the gauge tube. In either case the second, follower magnet will be supported by magnetic repulsion at a higher level and on the opposite side of the tube wall from the floating magnet.

In the preferred arrangement, as so far described there have been two magnets, one being float mounted and the other being arranged to follow movements of the first. However in an alternative arrangement, there are three such permanent magnets arranged to be movable coaxially, back and forth, generally along said tube axis. All said magnets are magnetized so as to have the same polarities in the field directions along and in parallel with the tube axis; and two of said magnets are arranged paired along said axis at a fixed distance from one another, while the third magnet is maintained generally coaxial with the magnets of said pair, and by magnetic repulsion, at a level between them. In such an array, the third magnet is supported by magnetic repulsion by the lower of the other two magnets.

Where the follower magnet is arranged outside the gauge tube, it conveniently surrounds the gauge tube. The magnet may be of multi-part ring construction and it may be housed in a multi-part indicator sleeve which slides up and down along the gauge tube and is clearly visible from all directions around the gauge unless masked by the body of the tank or receiver to which the gauge is connected. A clearly visible mark or marks can be provided on the sleeve and these will be so positioned, calibrated and chosen that they will indicate the correct position of the liquid level relative to the follower ring. This relative position may vary for example, firstly in accordance with the field strengths of the magnetic assembly and secondly in accordance with the density of the liquid in the gauge and hence the depth of immersion of the float in the liquid. Accordingly, appropriate calibration will be made and selection made from a range of marks provided on the indicator sleeve, by means of which the respective liquid levels can be indicated, as adjusted for given densities.

Inside the gauge there may be a cylindrical float which incorporates a pair of circular annular or disc shaped magnets spaced apart by a specified distance relative to their thickness. The levels of the magnets within the float may be adjustable. The disc magnets once adjusted for level, are firmly held in the float and are so disposed that their adjacent faces have opposite polarities.

The invention will be further understood by reference to the accompanying drawings in which.

Figure 4:
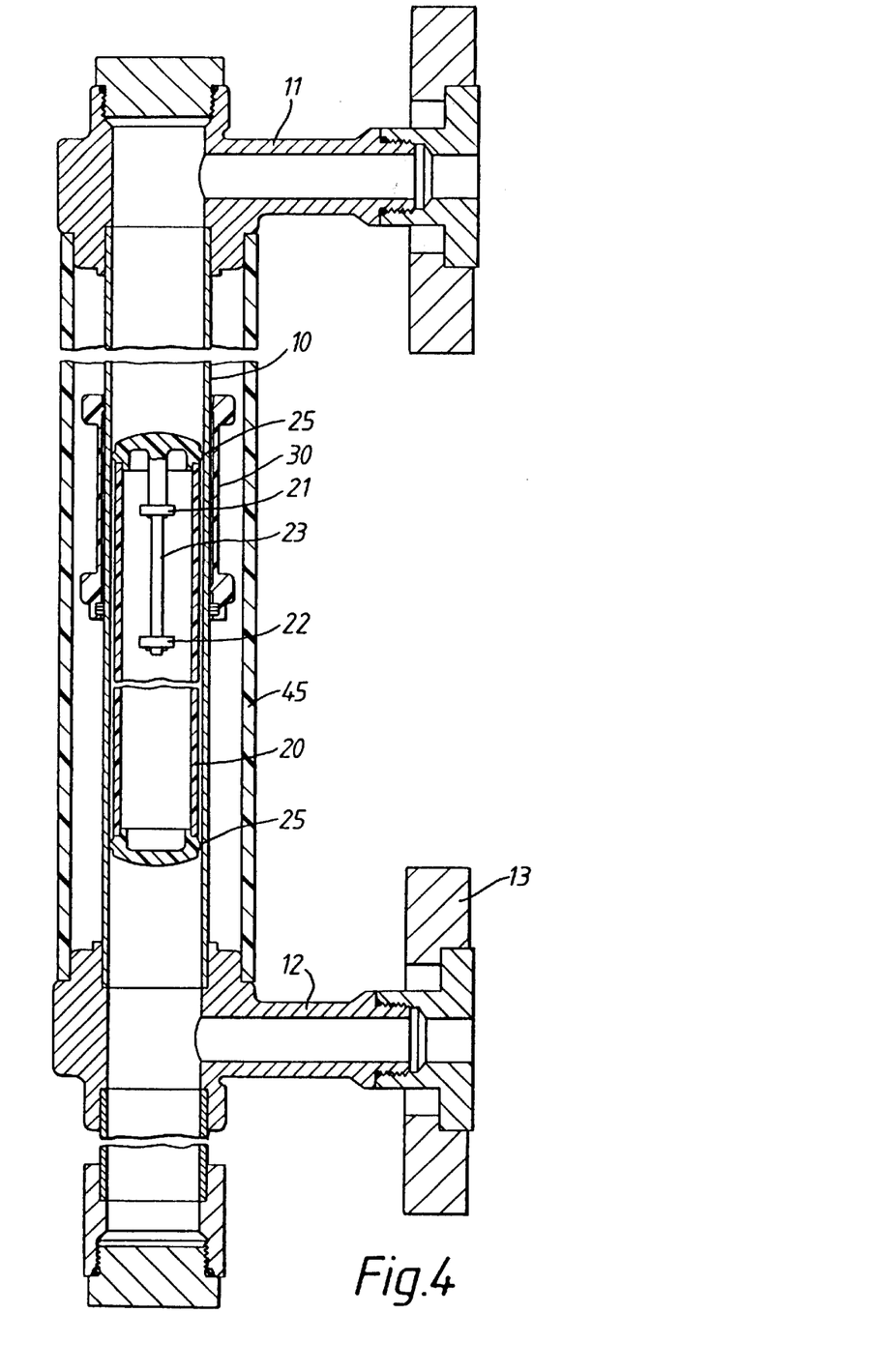
FIG. 4 is one embodiment of a liquid level gauge according to the invention, the assembly being shown in vertical cross-section.

Reference will be made first to FIG. 4, where a gauge tube 10 has its bore connected by means of top and bottom unions 11 and 12 with the interior of a tank part of whose wall is marked 13. The tank, the tube 10 and the unions 11 and 12 may form a sealed pressure resistant container for the liquid which latter may be harmful to the extent that it is a requirement that its escape must be prevented.

The tube 10 according to the invention is of non-magnetic material. For example it may be made of austenitic stainless steel in which case the liquid in its bore and the level of the surface thereof will be invisible, the tube wall being opaque. Such liquid level in the gauge tube corresponds to the level of liquid in the tank and the object of the invention is to provide an indication of the level notwithstanding that such level is invisible due to the opacity of the tube 10.

According to the illustrated example of the invention there is provided in the bore of the tube 10 a float 20 which is an elongate hollow cylindrical body of a plastics material. Mounted within the hollow interior of the float 20 are a pair of magnets 21 and 22 held spaced apart on a rod 23 which depends, in this example, from the upper end of the float.

The float 20 is an easy sliding fit in the bore of the gauge tube 10, the float having at each of its ends, a ring of small projecting pips or protrusions 25. These protrusions 25 make point contact when touching the interior wall of the gauge tube 10, helping to allow easy movement of the float 20 along the bore of the tube 10 as the level of the liquid rises and falls. The protrusions 25 are arranged in two spaced rings one at or near each of the opposite ends of the external cylindrical surface of the float.

The magnets 21 and 22 are strongly magnetized permanent magnets which may be cylindrical discs or rings. They are magnetized so that their poles lie generally on the axis of the cylindrical float 20 and of the tube 10. Both magnets are magnetized to have the same polarity; for example they may be polarized so as to have their North poles uppermost. The positions of the magnets 21 and 22 axially along the rod 23 may be adjustable. Such adjustment may be employed to calibrate the float to adjust for liquid density.

Mounted easily slidable along the outside of the gauge tube 10 there is an indicator sleeve, generally designated 30. The sleeve 30 is made like the float 20 of non magnetic material and it may be of a plastics material such as glass reinforced resin. It may have on its inside small protrusions like the protrusions 25 on the outside of the float 20, and these on the inside of the sleeve will make point contact with the outside wall of the gauge tube, in order to reduce the area of contact while permitting easy sliding movements of the sleeve along the tube.

Figure 5:
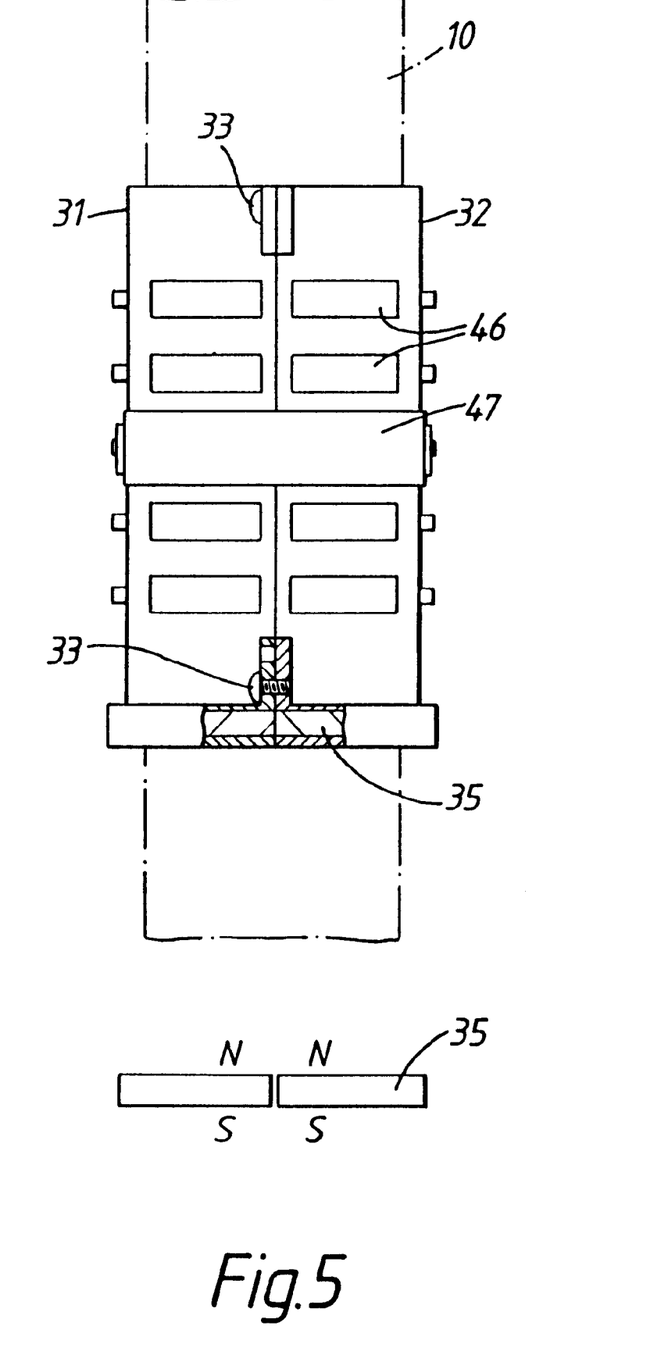
FIG. 5 is an enlarged frontal view showing one embodiment of indicator sleeve incorporating a follower magnet.

The sleeve 30 is of elongate cylindrical shape and as shown in FIG. 5 it is of multi-part construction comprising two half sleeves 31 and 32 which are secured together by screws 33. Housed within a gallery formed by the half sleeves 31 and 32, is a strongly magnetized permanent magnet 35 in the form of a ring which is itself formed by two C-shaped half-rings. The magnet 35 is magnetized axially and with the same polarity as the magnets 21 and 22 mounted in the float. All three magnets will have like poles facing in the same direction; and thus for example, all three magnets 21, 22 and 35 may have their North poles facing upwards in the arrangement shown in FIG. 4. The same arrangement of a gauge tube 10 with an array of three magnets, all having like poles facing in the same direction, and the magnetic force field pattern which occurs as a result, is shown in FIG. 1.

Figure 1:
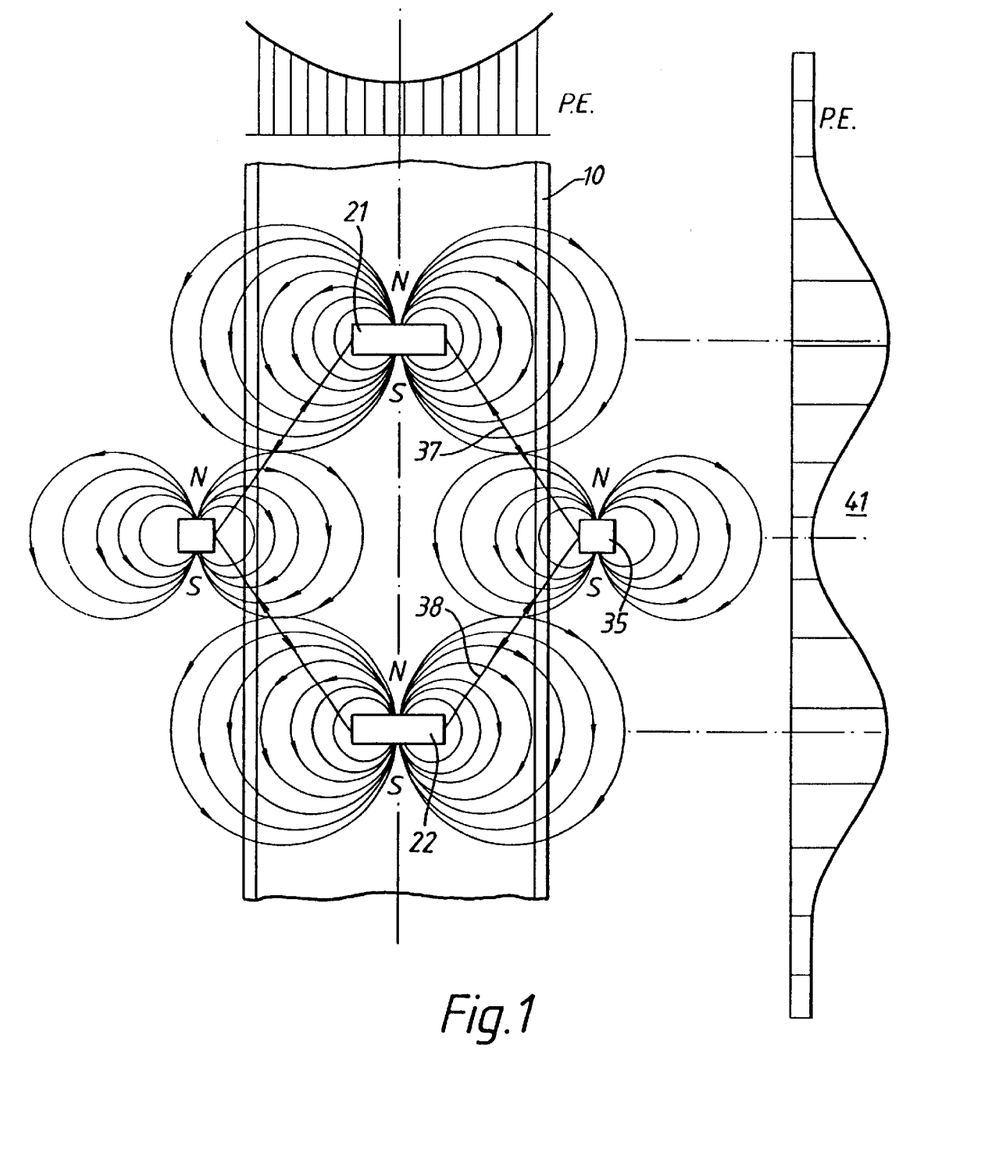
FIG. 1 is a diagram showing the magnetic force fields which exist when two magnets are located within a gauge tube and a further magnet is located surrounding the gauge tube at a level between the two inner magnets.

In the system of FIG. 1, the three magnets employed are all permanent magnets and they are all axially magnetised to have identical field directions which lie along the axis of the gauge tube 10 and they all have their North poles facing upwards. It will be noted that the polarities at the faces of the ring are unlike those of the adjacent faces in the float magnets; and thus in FIG. 1, the top face of the ring magnet 35 is a North pole which faces towards a South pole at the underside of the top disc magnet 21, while a South pole at the bottom face of the ring magnet 35 faces towards the upward facing North pole of the bottom disc magnet 22 mounted in the float 20. When magnetic poles are directly opposed one to another, the governing rule is that like poles repel while unlike poles attract. However, in the present case, the magnets 21 and 22 are inside the tube 10 and are of smaller diameter than the magnet 35 which is located outside the tube 10; and thus the poles are not directly opposed. Instead a consideration of the force field applicable, shows that the ring 35 is supported by the ring 22 by forces of magnetic repulsion. This may seem at first sight to be counter intuitive but it derives from the particular array adopted, and the interaction of the magnetic force fields. Tests have in fact shown that the arrangement functions very well and that there is a region where there exists a low or minimum level of Potential Energy, that is an energy well, which is located generally in the central plane between the two disc magnets 21 and 22. Axial displacement of the ring or follower magnet 35 from its central position, in either axial direction, meets increasing resistance so long as the dispositions of the float magnets and follower ring magnet remain substantially coaxial.

The reason for the reliable functioning of this system will be understood if consideration is given to the the properties and directions of the magnetic lines of force which surround all space around magnets. FIG. 1 is a diagrammatic representation of the configuration of the lines of force in the arrangement; and it also shows the energy well 41 where the axial Potential Energy is at a minimum, this being shown by plotting Potential Energy PE in the axial direction along the gauge tube, as at the side of the drawing. Magnetic lines of force may be taken to run from the North pole to the South pole and attraction forces make themselves felt along them.

It will be seen from FIG. 1 that the disc magnet 21 will be surrounded by toroidal lines of force leading from the North pole face to the South pole face, and these lines of force will be closely bunched (i.e. of higher intensity) close to the disc, and less closely disposed with progressively weaker forces in the regions further removed from the disc. The ring magnet 35 also will have twin toroidal half spools of lines of force surrounding it. One half spool will lead from the North pole face of the ring to its South pole face on the inside of the ring, and the other half spool will lead likewise, on the outside of the ring.

It is the case that forces of magnetic repulsion arise transversely between lines of force so long as these run parallel to each other. As shown in FIG. 1, across a line at an angle of between 30° & 45° to the gauge tube axis, drawn from the lower edge of the top disc magnet 21 to the centre of the upward pole face of the ring magnet 35, that the torodial lines of force for both the disc magnet 21 and the ring magnet 35 will run in the same parallel direction, and therefore that forces of magnetic repulsion will occur and will make themselves felt along this line. As the disposition of these repulsive forces is circumferentially symmetric about the magnet axes, there will be a resultant repulsive force indicated by the arrows 37, tending to separate the ring magnet 35 from the disc magnet 21 in an axial direction. On the opposing side of the ring magnet 35 there will be a similar opposing configuration of forces of magnetic repulsion, leading to a resultant repulsive force indicated by the arrows 38. Due to the combined effects of these repulsive forces, as depicted by the arrows 37 and 38, the ring magnet 35 (disregarding its weight) will tend to adopt an axial position which is substantially midway between the disc magnets 21 and 22; and any axial displacement of the ring magnet 35 from this mid position, in either direction, will meet increasing resistance and it will always be pushed back to its middle position of minimum Potential Energy. Due to its weight the magnet 35 will in practice adopt a level which is lower than a mid position between the levels of the two inner magnets 21 and 22.

In the arrangement of FIG. 1, it is the inner magnets 21 and 22 which are float mounted while the outer ring magnet 35 is a follower magnet. However, the invention extends to the converse arrangement where the magnet or magnets disposed outside the gauge tube is/are float mounted, while the magnet or magnets disposed within the tube respond or follow the movements of the outer magnet or magnets.

There will also be magnetic attraction between the upward facing North pole of the ring magnet 35 and the downward facing South pole of the disc magnet 21, but because of the large axial distance between these faces, these forces will be weak and they will in any case be counteracted by opposing attraction on the other face of the ring magnet and the bottom disc. While it is true that as regards these forces of attraction, the location of the ring magnet 35 at a middle position between the discs 21 and 22 will not necessarily be a stable position of minimum Potential Energy, the forces of magnetic attraction will be at low intensity and they will not be able to disturb the stable equilibrium position resulting from the repulsion forces due to the inherent field of lines of force surrounding the disc magnets and the ring magnet.

The axially stable position of equilibrium between the ring magnet 35 and the disc magnets 21 and 22, as described, is also a position in which the ring magnet experiences no or only minimal radial forces which might cause friction between the outside indicator follower and the gauge tube on the one hand, and the float and inside wall of the gauge tube on the other hand. As has been explained, the position described is one of equilibrium between forces of magnetic repulsion, and a relatively small movement radially from the true coaxial position will give rise to increased repulsion tending to return the ring to its coaxial position. This arrangement is therefore particularly beneficial for the purpose of magnetic gauge operation because the follower firmly follows the movement of the float up and down always in the middle position between the disc magnets and yet there are no, or only very small, radial forces tending to produce friction which might render the operation of the level indication sluggish. Practical tests show that the operation of the gauge with the magnetic coupling as described is both reliable and very sensitive.

In particular, the arrangement of the magnets adopted in FIG. 1 and in FIG. 4, provides for forces of magnetic repulsion acting radially of the tube axis which tend to centralize the magnets both inside and outside the tube. This tendancy of "self centering" has the important effect that if the internal magnet or magnets can be maintained at locations which coincide with the axis of the tube, then contact of all magnets with the tube walls will be minimized.

Referring to the embodiments of FIG. 1 and 4, the description above has been on the assumption that all the magnets are polarized with North poles facing upwards. However it will be apparent that the converse arrangement, where all the magnets are polarized to have South poles facing upwards, will function equally well. When considering the appropriate polarization it is the disposition, interaction and functioning of the force fields which is important.

Figure 2:
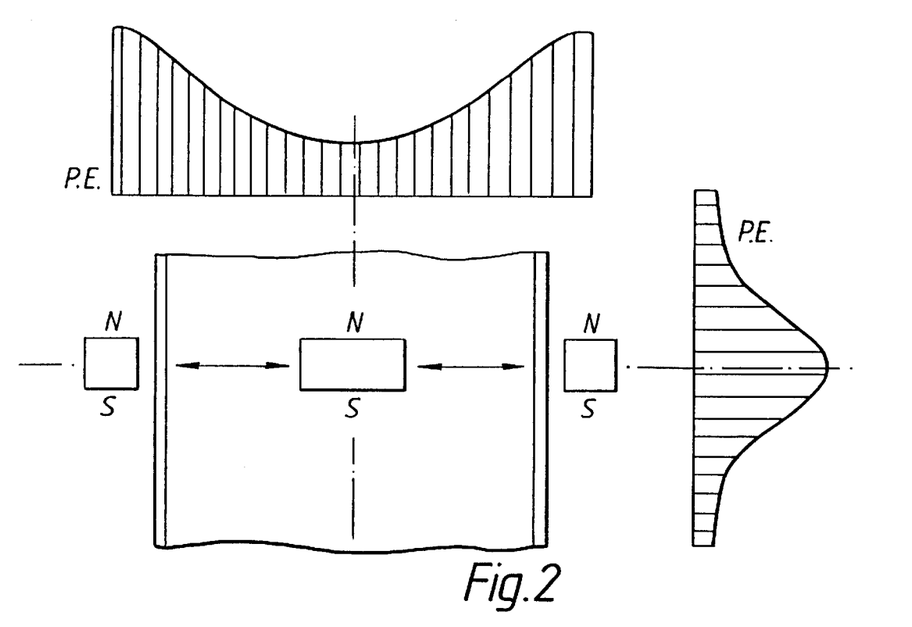
FIGS. 2 and 3 are diagrams illustrating the potential energy which arises in two contrasting magnet pole arrays for arrangement in a gauge tube.

Further aspects of the nature of the magnetic coupling system as described can also be understood if the effect of a single disc magnet is considered acting in conjunction with a ring magnet is considered in relation to the arrangement shown diagrammatically in FIG. 2, where a ring magnet is seen coaxial with and lying in the same axial plane as a disc magnet. If both magnets will have the same polarity in any given axial direction, there will be on the one hand intense radial repulsion forces between the ring and the disc tending to hold the ring in a coaxial position; and on the other hand the axial equilibrium will be unstable, because any small movement axially in any direction will increase the distances between like poles. The position in fact will be one of Potential Energy maximum from which the ring will tend to try escape in either axial direction if allowed to.

FIG. 2 represents the disposition of two magnets as described, and also gives a schematic indication of the axial and radial distribution of the Potential Energy of the follower ring magnet. If the magnet which is located inside the tube is mounted on a float at the surface of a liquid whose level is to be monitored, then the outer ring magnet will be the follower which rises and falls in sympathy with changes of liquid level, and such outer ring magnet will be supported, by magnetic repulsion, at a level which is above that of the inner magnet. The configuration of FIG. 2 may employ a single disc magnet mounted inside the float, and with a single ring or follower magnet mounted in the indicator body or sleeve which slides on the outside of the gauge tube. It is of course essential that the follower magnet is so arranged that it always takes a position which is above the float mounted magnet. The repulsion between the two magnets will be balanced by the weight of the follower or indicator unit. When liquid level rises, the float mounted magnet will lift and drive the follower magnet upwards; while when liquid level falls, the follower magnet will slide down the gauge tube under the effect of its own weight.

If in the converse array, it is the inner magnet which is the follower, with the outer magnet being float mounted at the surface of a liquid , then, the inner magnet, which will move within the tube, will be supported by magnetic repulsion, at a level which is above that of the outer float mounted magnet located externally of the tube.

While this is a simpler version of gauge, it has a disadvantage as compared with the double ring or disc float mounted magnet arrangement described with reference to FIG. 1, in that the height relative to the float is not as precisely defined, and in that the presence of any dirt or grime may cause increased sliding friction on the gauge tube, so that the follower magnet may be unable closely to follow the rising and failing movements of the float mounted magnet.

Returning now to the double disc float mounted magnet arrangement of FIGS. 1 and 4, and imagining the ring magnet first as if it was lying on the same plane as one of the discs magnets 21 or 22, it will be understood that by displacing the ring towards the other disc it will move from a region Potential Energy maximum to a point where the gradient to the Potential Energy peak over the other disc makes itself felt. There will in fact be defined between the discs an axial position for a Potential Energy minimum; and with disc magnets of equal strength, this will lie at a level between the two float mounted magnets. In practice, with a vertical disposition of the gauge, the follower body will come to rest slightly at a level below the middle plans between the discs, with increased repulsion between the ring magnet and the lower disc acting to counterbalance the weight of the follower and the magnet mounted thereon. This departure from the middle position will, however, be stable and both on the rise and fall of the float the follower magnet will positively be pushed towards its new position of equilibrium.

The spatial and dimensional relationships of the float mounted magnets and the ring magnet is of some importance for the reliable functioning of the device, and by way of example, a practical execution may be quoted wherein the disc magnets mounted in the float are 12.5 mm in diameter and 3 mm thick and they are spaced 40 mm apart. The ring magnet in this example has 35 mm internal diameter and 41 mm external diameter and is also 3 mm thick.

Other dimensions and sizes can of course be employed, but it is important that the distance between the disc magnets should be relatively large both in relation to the thickness of the discs as well as the thickness of the ring magnet, also a relatively large difference between the internal diameter of the ring magnet and the discs is significant and amounts to nearly 3:1 in the example given.

Figure 3:
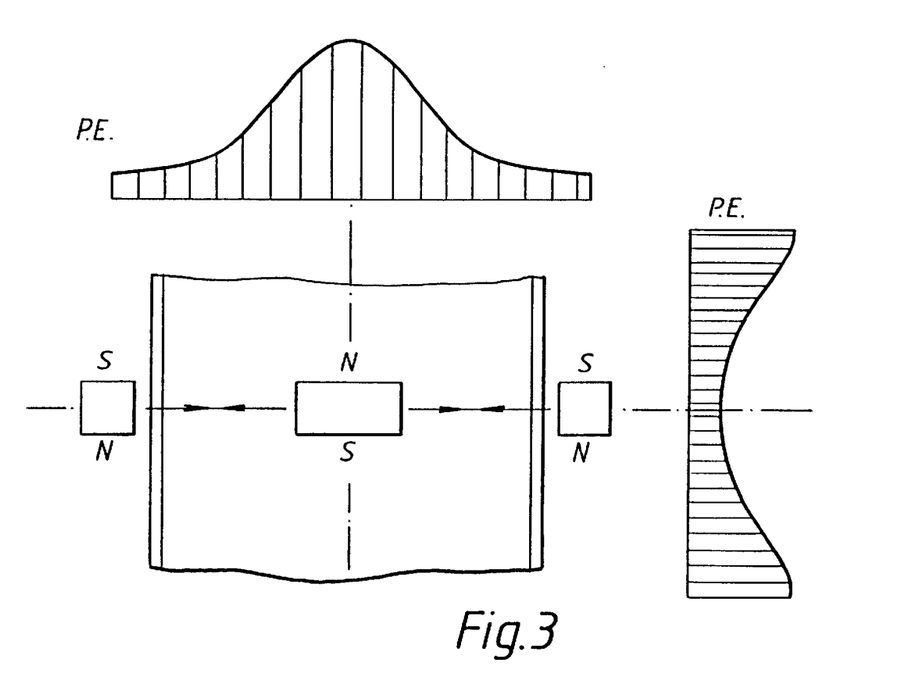

The magnetic coupling arrangements described above will be further understood if the configuration depicted in FIG. 3 is considered. Here the inner float magnet and the outer follower magnet are oppositely polarized. In such a case the position of the ring magnet in the plane of the disc magnet will be one of a Potential Energy minimum in the axial direction. Any displacement in either direction axially will give rise to attraction forces between the unlike poles and these will have a component in the axial direction tending to return the ring to its central position in the plane of the disc. However, in this case there will also be an unstable equilibrium in the radial sense and any slight radial displacement from the axial position will give rise to strong radial forces tending to increase this displacement due to the attraction in the unlike poles which increases on the side of the smaller radial clearance and decreases on the side of the larger radial clearance. Where the inner magnet is float mounted, as will usually be the case, this arrangement will cause radial friction to occur between the follower sleeve and the outside of the gauge tube on the one hand, and the float and the inside of the gauge tube on the other hand. Such friction effects will make the functioning of the level indication sluggish and unreliable.

While in the magnetic coupling arrangement above described with reference to FIGS. 1 and 2, radial forces between float and follower are small or non existent, it is nevertheless advantageous to keep the float in as central a position in the gauge as possible. The float itself will generally have some clearance between its outer diameter and the bore of the gauge to allow easy rise and fall, the float as envisaged in this specification is advantageously provided with the small projecting pips or protrusions 25 around its circumference calculated to touch the wall of the gauge tube to maintain the float in the desired coaxial disposition; also such protrusions will prevent contact of the float with the wall over an excessive area and will provide room for allowing adequate liquid flow past the float on bobbing movement on the liquid level.

It is particularly advantageous to arrange the projecting pips or protrusions 25 in two rings in planes close to the top and bottom edge of the cylindrical float 20. These will be so arranged that when it slews over, the float will be prevented from touching the bore of the gauge tube with either its top or bottom edge where such may be present, i.e. in the case where there are no hemispherical ends to the float, but where the float is constructed with a top and bottom welded lip. The friction caused by such a welded lip may be excessive and the provision of the rings of pips near the top and bottom edges prevents this friction being set up. Any contact between the float and the tube will be limited to a minimal area being that of the pips 25 which are the only parts of the float which make contact with the gauge tube wall.

The float 20 will ride at the surface of the liquid whose level is to be measured, at a height which will depend upon the density of that liquid. Accordingly it is necessary to provide for calibration for this; and for calibration to compensate or allow for the forces of magnetic repulsion, and to allow for the weight of the follower sleeve assembly 30 with the magnet 35 housed therein. Adjustment for purposes of such calibration may be provided in part by moving the magnets 21 and 22 up and down along the rod 23 within the float 20 as previously described. Or and as shown in FIG. 5, the follower sleeve 30 may be marked with a number, for example five, of different level positions 46 which may respectively correspond to different levels adopted by the float 20, which in turn will be dependent upon the density of the liquid which supports the float; and as shown at 47 a marker which may be coloured, will be placed at an appropriate selected level position 46, when calibration is completed, to give prominence to a marking at the appropriate level.

As a yet further feature according to this invention the magnetic gauge can be surrounded by a housing of, say, transparent plastic material which will protect the outer surface of the gauge tube from damage or dirt. The transparent housing is indicated at 45 in FIG. 4, and it can conveniently be made up of half round transparent plastic sheeting clamped together along opposing longitudinal edges by means of clips or clamping strip profiles of extruded rubber or plastic material. At the top and bottom ends of the housing this will conveniently seal against suitably formed faces from the gauge connection bodies which may also be provided with sealing means to prevent the ingress of dirt or oil.

A magnetic level gauge according to this invention may also be provided with sensors which will sense the position of the magnetic ring in the follower body along the gauge tube. Such sensors may be based on the Hall Effect Principle which gives rise to an electronic signal by the close proximity of the strong magnetic field. Such sensors may be conveniently used for high and low level alarm systems as are frequently required in gauging applications. In order to distinguish the direction in which an alarm position may be traversed, say from normal to full or from over full to normal, the Hall Effect Sensors can be arranged in closely spaced pairs which can operate a logic sequence giving rise to a signal when, say, the lower sensor is passed first and the upper second (high level alarm), but does not give rise to a signal when the top sensor is triggered first and the lower sensor second (level falling from over full position).

Sensors of the type described may be attached to a gauge either along the clamping edges of the two housing halves or they may be disposed along one or more rods passing from the top gauge connection to the bottom gauge connection and where their height can be adjusted to the required position. Similar sensors, but not necessarily in closely spaced pairs, can be disposed at various discrete positions along the gauge to give intermediate signal indication between high and low level alarm positions. The gauge design as a whole will give a robust and serviceable arrangement which is economic in its execution and can meet a wide range of service requirements.

Several inversions of the systems shown in the drawings can be envisaged. As mentioned above, the external gauge tube fitted to a tank can become a tube inside the tank passing through the liquid. In such a case, the ring magnets surrounding the tube can be incorporated in a float which floats on a liquid level or on some interface between two liquids. What was in the system described as a float inside the tube will now become a follower bobbin which rises and falls inside the tube in response to the movement of the ring magnet in the outside float. The bobbins inside the tube could then serve as an external indication of the position of the float. For shallow tanks this could be in the form of a protruding pointer which rises and falls against a scale on top of a tank. In deeper tanks electric or electronic means can be envisaged to indicate float position such as the movement of a contact along a potentiometer wire.

There may also be a case, especially in the case of an internal gauge tube in a tank, to have two spaced out rings outside the tube suitably housed in the float and have a single magnetic disc inside the tube moving up and down with the float and being used as the remote indicator means. This could be an advantage due to the lower weight of a single disc magnet which would be counterbalanced only by the repulsion from the lower of the external ring magnets. The method of functioning of this system would be entirely analogous to that described for external gauge tube.

Finally, the disc magnets inside the gauge tubes may have holes in them, say to carry an indicating pointer reaching to the top of the tank, or the disc magnets may altogether be formed as ring magnets still axially magnetised. Such an arrangement would work largely in a similar manner as a disc magnet but it may be less compact and efficient than a disc. There may, however, be constructional features in the design which would make use of rings instead of discs desirable.

Each magnet of the gauge may be linked to or incorporated in a quasi-cylindrical member constituted as a cylinder slidable along within the tube or as a sleeve slidable along outside the tube; and preferably, each such quasi-cylindrical member has an axial length which is at least 1.5 times the diameter of the face of the tube against which it slides. This imposes a limit to the extent to which the responsive member can be upset from a true axial alignment and thus promotes a free easy sliding movement and reduces any tendency the respective members may have to jam against the tube.

Preferably, in embodiments provided with a said third magnet which is mechanically linked to another said magnet, those two linked magnets are axially spaced (centre-to-centre) by a distance which is at least equal to the external diameter of the tube.

What is claimed is:

1. A liquid level indicator which comprises:

an upright cylindrical tube of non-magnetic material, a cylindrical, permanent first magnet element aligned with, and movable coaxially within, the tube, a float, and an annular, permanent second magnet element aligned with, and movable coaxially outside, the tube, wherein said first and second magnet elements have magnetic fields in alignment with one another, and wherein one of said first and second magnet elements is carried by the float while another of said first and second magnet elements is not carried by the float, and wherein said first and second magnet elements are axially spaced relative to one another such that said one of said first and second magnet elements carried by the float supports by magnetic attraction said another of said first and second magnet elements not carried by the float.

2. An indicator according to claim 1, wherein one of the first and second magnet elements includes a pair of permanent magnets of similar form one to another having magnetic fields aligned with one another and with another one of said first and second magnet elements.

3. An indicator according to claim 2, wherein said first and second magnet elements are movable axially back and forth generally along an axis of the tube and are permanently magnetized to exhibit the same polarities in a field direction along and parallel with the tube axis, and wherein said pair of permanent magnets of said one of the first and second magnet elements are separated from one another by a fixed distance, and wherein said another of said first and second magnet elements is maintained generally coaxially with and, by magnetic repulsion, at a position between said separated pair of permanent magnets.

4. An indicator according to claim 1, further comprising a liquid level indicator sleeve slidable along an exterior of the tube, wherein the first magnet element is carried by the float and the float is slidable within the tube, and wherein the second magnet element is attached to the liquid level indicator sleeve.

5. Liquid level indicating gauge comprising:

an upright cylindrical tube of non-magnetic material, a first magnet element having a cylindrical permanent disc or ring magnet movable axially within and along the tube, and a second magnet element having an annular shaped permanent magnet surrounding the tube and movable axially along the outside thereof, wherein both permanent magnets of said first and second magnet elements are magnetized and maintained in such orientation relative to each other and to the tube as to have the same polarities in field directions with their magnetic poles being aligned along an axis of the tube or in parallel therewith, and wherein the first magnet element is incorporated in a float that is adapted and arranged to float at the surface of a liquid, while the second magnet element is supported by magnetic repulsion at a level above that adopted by the floating permanent magnet, with said magnetic repulsion having both axial and radial components.

6. Apparatus according to claim 5, wherein one of the magnet elements includes two permanent magnets of similar form one to another, and whose magnetic fields are aligned in the same direction one to another, as well as to the other magnet element.

7. Apparatus according to claim 6, further comprising a liquid level indicator sleeve arranged slidable along the tube externally thereof, wherein the one of the magnet elements which includes two permanent magnets is carried by the float and arranged movable coaxially along the tube, and the other magnet element is carried by the liquid level indicator sleeve externally thereof under the influence of the permanent magnet of the magnet element carried by the float inside the tube.

8. Apparatus according to claim 7, wherein the tube and the liquid level indicator sleeve are enclosed within a transparent housing.

9. Apparatus according to claim 7 wherein the liquid level sleeve carries markings at a plurality of levels, calculated to correspond to flotation levels of the float at the surface of the liquid in which the float floats, said flotation levels varying in dependence upon at least one of the densities of the said liquid, and/or said markings being calculated to compensate for the level of the float supported magnet relative to the level of the magnet installed in the indicator sleeve, and including indicator means for affording prominence to a marking at a selected one of said levels.

10. Apparatus according to claim 7, wherein the indicator sleeve is split in an axial plane and is formed by two separable half sleeves which can be fixed together when the half sleeves have been assembled, each half sleeve carrying a respective half of the permanent magnet of the appurtenant magnet element.

11. Apparatus according to claim 7, wherein the float has an elongate cylindrical wall opposed to the internal wall of the gauge tube, and wherein contact between the float and the gauge tube wall is minimized by providing on the cylindrical wall of the float small pips or protrusions, there being two spaced rings of such protrusions on the float wall, these being the sole parts of the float which make contact with the gauge tube wall.

12. Apparatus according to claim 7, in which the two permanent magnets of the said one magnet element are mechanically fixedly linked to one another, the two linked magnets being axially spaced center-to-center by a distance which is at least equal to an external diameter of the tube.

* * * * *